INVENTORS.
RAYMOND W. ROGERS &
CHARLES P. SPENCE
BY
ATTORNEY

Nov. 3, 1964  R. W. ROGERS ETAL  3,155,244
SHEET FEEDING AND MANIPULATING DEVICE
AND MISFEED DETECTOR MEANS THEREFOR
Filed Sept. 19, 1962  5 Sheets-Sheet 2

INVENTORS.
RAYMOND W. ROGERS &
CHARLES P. SPENCE
BY
*Leland P. Chapman*
ATTORNEY

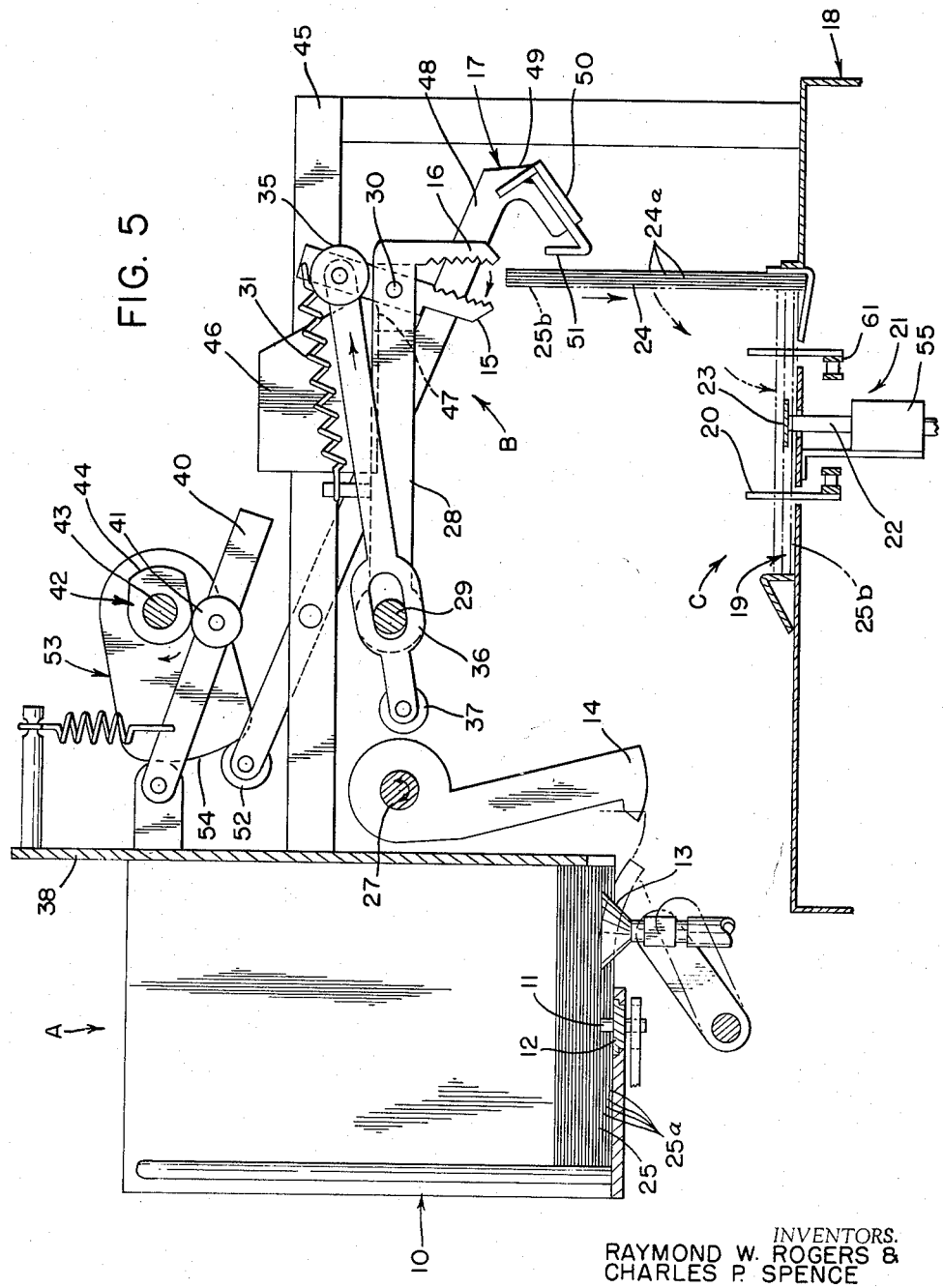

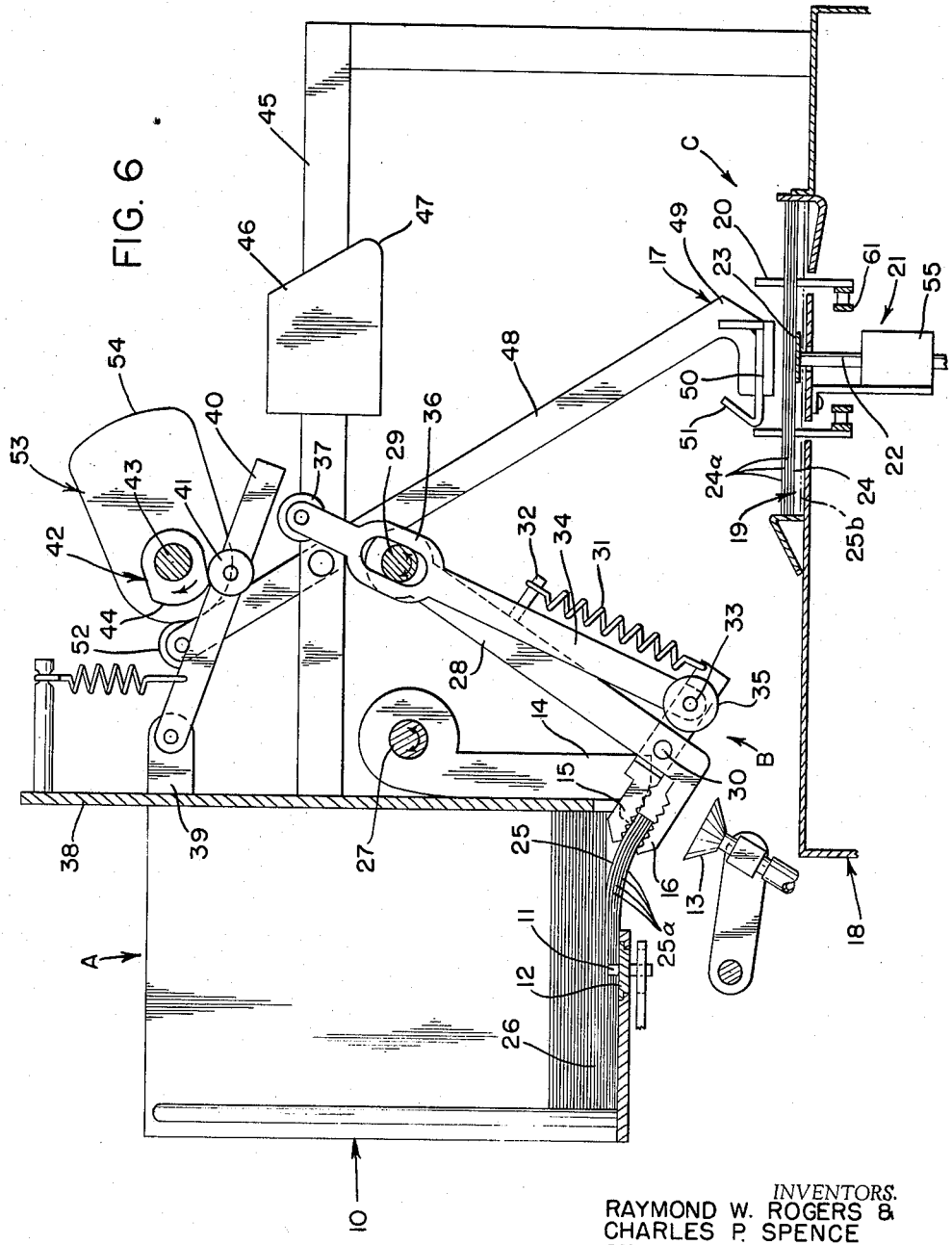

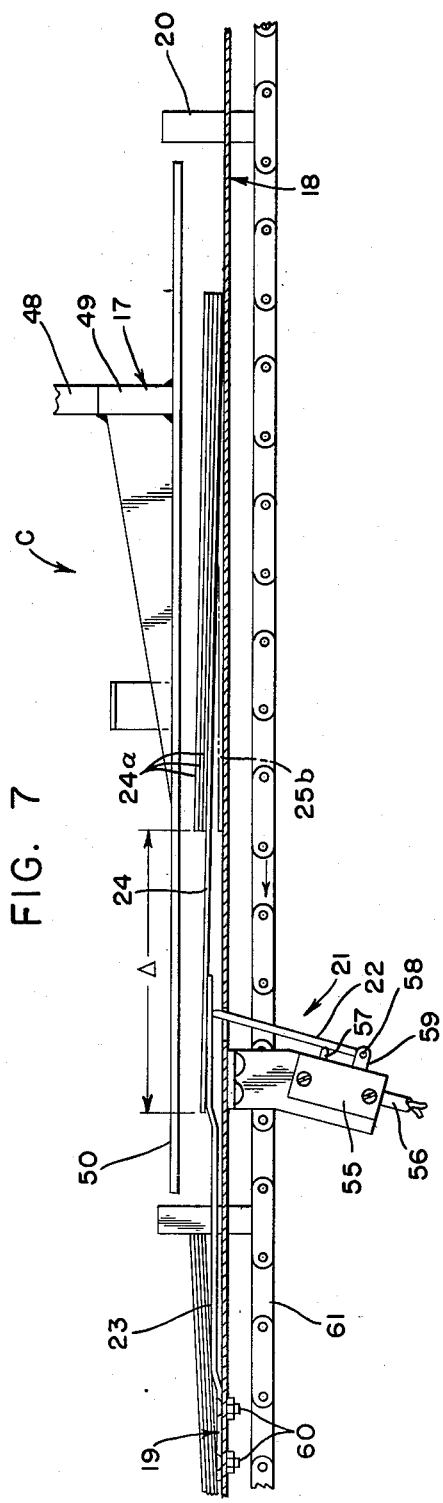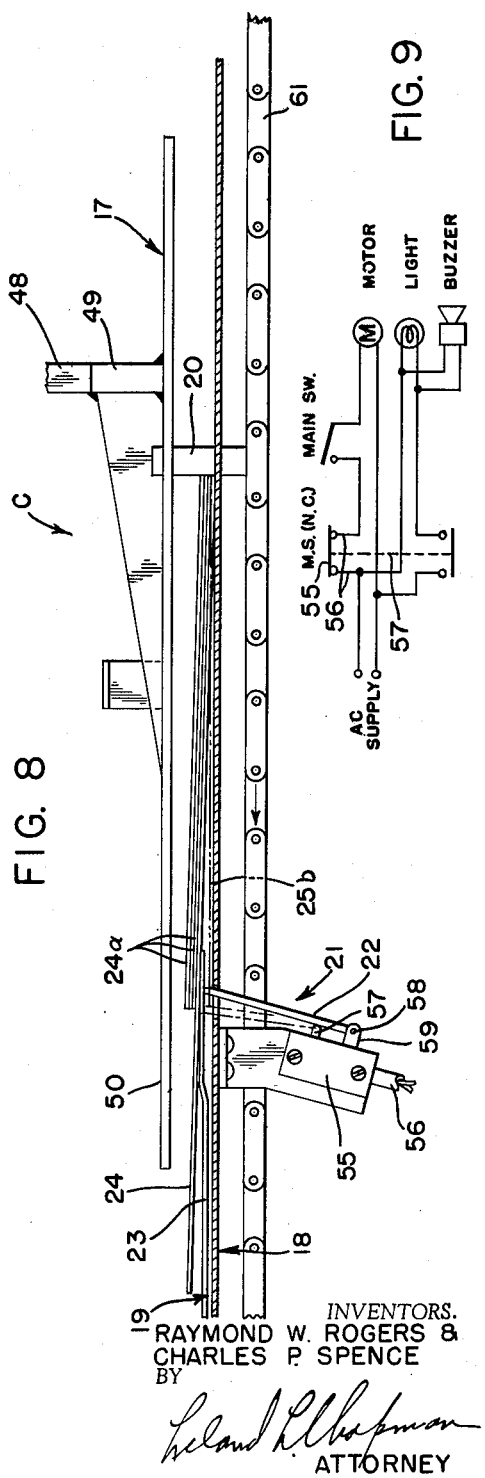

3,155,244
SHEET FEEDING AND MANIPULATING DEVICE AND MISFEED DETECTOR MEANS THEREFOR
Raymond W. Rogers, Brunswick, and Charles P. Spence, Lakewood, Ohio, assignors to The Standard Oil Company, Cleveland, Ohio, a corporation of Ohio
Filed Sept. 19, 1962, Ser. No. 224,745
7 Claims. (Cl. 214—8.5)

Our invention relates to sheet feeding and manipulating devices, and more particularly, to the detection of the misfeeding of sheets by such devices.

The sheet feeding and manipulating devices contemplated by this invention are those which simultaneously process, as a package, two or more superposed sheets of material, one of which sheets has at least one greater major dimension (i.e., length or width), with respect to the other sheet or sheets in the package. This dimensional differential will be referred to throughout as the Δ dimension. The sheet material processed is preferably in the form of cards, and most preferably in the form of data-containing punch cards. As described, these devices are commercially available and well known in the art.

Devices of the type involved in this invention find utility in the manufacturing, supply and transportation, retailing and banking industries, to name just a few. To the millions of consumers who purchase their petroleum products with credit cards, the packages of cards processed by such devices are indeed a familiar sight. These packages consist of one or more individual transaction receipts for purchases of petroleum products, in the form of relatively short punch cards, and a composite statement of total purchases, in the form of a relatively long punch card. The longer card, or statement card also contains the purchaser's name and address, and when the package of cards is properly inserted in its mailing envelope, this information is visible through a "window" in the envelope.

The devices which process such packages of cards perform a number of independent, cooperative operations. The packages of cards are generally presented to the device as a stack of packages. The device then destacks the packages one at a time and places them on a runway. The package is then moved along the runway to other stations, where advertising matter and/or other information and a return address envelope are fed to the package. The device then inserts all of this material into a "window" envelope in such a fashion that the name and address printed on the statement card is visible therethrough. The device may also include additional stations for sealing the envelopes and imprinting postage thereon.

These devices frequently operate at very high rates of speed. Upwards of forty thousand packages of cards can be processed in an eight hour day, which amounts to over five thousand packages per hour of actual machine operation.

The problem of misfeeding is everpresent in an intricate machine of this type, and the problem is greatly magnified as the speed of operation increases. One such misfeeding problem occurs during the destacking operation of the feeder station of the devices described. In order to understand the nature of the problem, its consequences, and the efficacy of the corrective measures provided by our invention, it will now be necessary to consider in some detail the manner in which cards are destacked and subsequently manipulated in one particular commercially available device which constitutes a specific embodiment of our invention. This particular device is fed from a feeder station where card packages consisting of a (longer) statement card with an accompanying set of one or more (shorter) individual transaction cards, are stacked in such fashion that the statement card with its address side up is placed on top of its accompanying individual transaction cards. A package of cards so assembled is pulled down from the bottom of the stack by a sucker cup which operates on the Δ dimension of the statement card. As a package is thus displaced from the stack, it is engaged by gripper jaws which operate to carry the package over a transport means called an insert raceway, turn the package over and deposit the package on a section of the insert runway in such a fashion that the address side of the statement card is in contact with the insert raceway and the associated individual transaction cards are superposed on the statement card.

The operating difficulty which has been encountered is as follows. In destacking packages of cards with the sucker cup, it sometimes happens that there will adhere to the address side of a statement card, one or more errant individual transaction cards which should have remained behind to accompany the next above statement card in the stack. The effect of this improper destacking is that when the package with the errant card is turned over by the gripper jaws and discharged on the insert raceway, the errant card becomes interposed between the address side of the statement card and the raceway. When such an improper package is subsequently inserted in a "window" envelope, the address on the statement card which should be visible is covered by the one or more errant cards. Obviously such an envelope cannot be delivered and is in due course returned to the sender by the Post Office.

To further complicate matters, the next package in the stack, barring a second improper destacking operation, while deliverable by the Post Office, will be deficient in one or more individual transaction cards, being minus the above described errant cards. Thus it will be apparent that each misfeed creates two errors and unless these errors are detected on the machine, subsequent correction, which in any event must be made, is costly and time-consuming.

We have developed a detector for alleviating the problems caused by the improper destacking of packages of cards in devices of the type described. Our detector takes advantage of (1) the Δ dimension of the one card in the package having the greater, major dimension with respect to the other cards in the package, and (2) the fact that in a normal destacking operation, the card with the greater, major dimension, is brought in juxtaposition with the transport means or insert raceway.

Our detector comprises detecting means positioned on or in the insert raceway. The location of the detecting means with respect to that portion of the raceway upon which the card package is first deposited is critical. The detecting means must be positioned beyond, and in the direction of travel of the place where the card or cards of lesser dimension are deposited, and at the same time, it must also be positioned underneath the place where the card of greater dimension is deposited. Stated another way, the detecting means must be positioned at a point in the raceway which initially receives the Δ dimension.

It will be recalled that in a normal and proper destacking operation, the card of great dimension is deposited in juxtaposition with the insert raceway and the card or cards of lesser dimensions are located on top thereof. With the detecting means positioned as described, the package so formed will simply ride up and over the detecting means as the package is transported to succeeding stations along the raceway, and the detecting means will remain inactive.

On the other hand, where a package is improperly destacked, an errant card of lesser dimensions interposes itself between the card of greater dimensions and the raceway. With the detecting means positioned as described, the card of greater dimensions and the card or cards of lesser dimensions properly located on top thereof will ride up and over the detector as just described, but the errant card of lesser dimensions will move directly into the detector, tripping same and stopping the machine.

It is therefore an object of our invention to provide an improved sheet feeding and manipulating device.

It is a further object of our invention to provide a detector for such devices which senses the misfeeding of sheets and responds appropriately to the detection of sheet misfeeds.

Other objects and advantages of our invention will become apparent from the following detailed description of a specific embodiment of our invention, with reference being made to the accompanying drawings, in which:

FIG. 1 in schematic perspective illustrates in cooperative relationship, a feed station, a destacking means, an insert raceway and the misfeed detector;

FIG. 5 is an end elevation view with parts omitted and parts in section showing one stage of the card package manipulating cycle;

FIG. 6 is similar to FIG. 5 except that it shows a different stage of the card package manipulating cycle;

FIG. 7 is an elevation view showing the position of a package of cards as it is deposited on the insert raceway;

FIG. 8 is similar to FIG. 7 except that it shows the package of cards after it has been moved somewhat to the left, as viewed in the drawing, along the raceway;

FIG. 9 is a schematic diagram of the electrical circuitry connecting the detector to the motor which operates the machine and to various signal devices.

Figure 1:
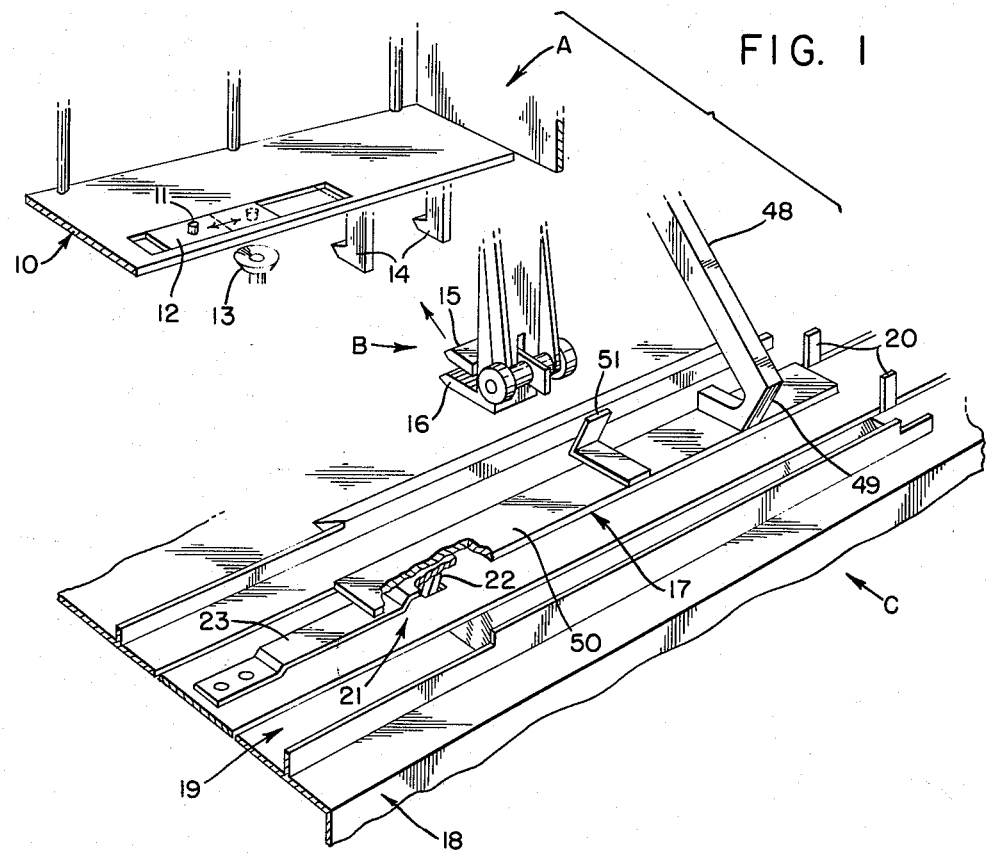

The portion of the sheet feeding and manipulating device illustrated in FIG. 1 can conveniently be divided into three subassemblies which have been labelled A, B, and C. Subassembly A represents the feed station, subassembly B the transfer mechanism, and subassembly C the insert table.

The salient features of feed station A include stacking cage 10, short-card aligning pin 11 mounted on slide plate 12, sucker cup 13 and separator arms 14. The transfer mechanism includes a pair of gripper jaws 15 and 16 with supporting means, and a hold-down means generally designated as 17. The insert table C includes frame 18, insert raceway 19 and chain driven dogs 20. Our novel misfeed detector is designated generally at 21 and includes a detecting finger 22 and guide bar 23. The manner in which these various elements cooperate to destack a package of cards, transport the package to the insert table, and deposit the package in the insert raceway of the insert table will be described in detail hereinafter.

Figure 2:
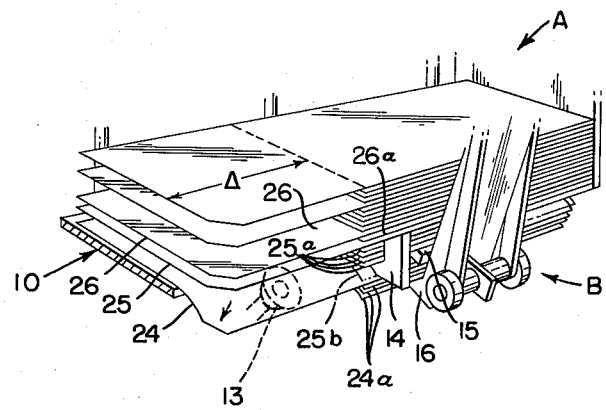
FIG. 2 is a schematic perspective view showing gripper jaws in destacking engagement with the bottom package of cards at the feed station.

FIG. 2 shows the feed station A partially loaded with a plurality of superposed packages of cards. Each package consists of a long card and one or more short cards. The short card or cards which accompany a given long card are those which are disposed directly beneath the long card in the stack. Thus, short cards 24a accompany long card 24; short cards 25a accompany long card 25; short cards 26a accompany long card 26 and so forth.

As further shown in FIG. 2, the transfer mechanism B is in the process of improperly destacking a package of cards. The lowermost package of cards in the stack should consist of long card 24 and short cards 24a disposed therebeneath. It will be noted, however, that the gripper jaws 15 and 16 have also embraced an errant short card designated 25b. This errant card, should, of course, have remained behind to accompany long card 25 and short cards 25a, but was inadvertently pulled down when sucker cup 13 operated on long card 24. Just why this happens is not known, but is is thought that it might be caused by the presence of a sticky substance on the upper surface of card 24 or on the lower surface of card 25b; or by static attraction or some other physical phenomenon.

Figure 3:
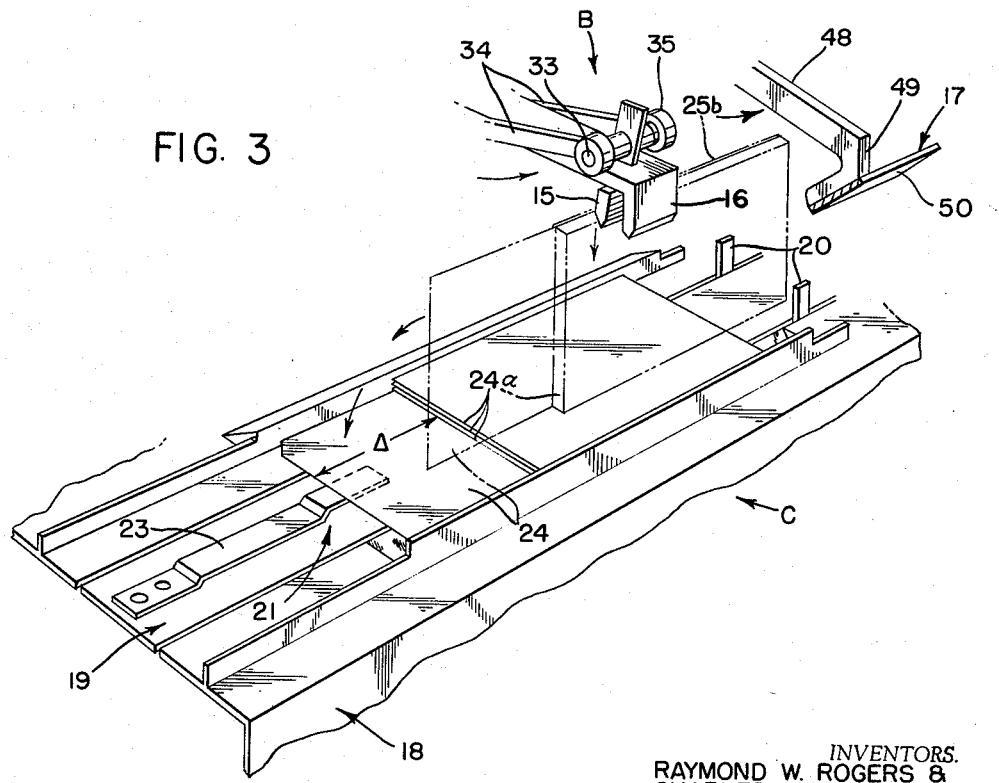
FIG. 3 is a schematic perspective view showing gripper jaws at the point of release of a package of cards onto the insert raceway.

In FIG. 3, this improperly composed package, consisting of long card 24, short cards 24a and errant short card 25b is shown in phantom lines just after being released by gripper jaws 15 and 16 over the insert table C and in full lines, disposed in insert raceway 19. Errant card 25b is not visible since it is disposed between long card 24 and insert raceway 19.

We will now describe the cyclic operation by which a package of cards is destacked, transferred to the insert table and deposited in the insert raceway.

Since the machine is never at rest, i.e., a cycle of operation begins before the next preceding cycle has been completed, it is necessary to arbitrarily select a starting point for purposes of this discussion. The location of the various elements as depicted in FIG. 5 represents a convenient starting point since a package of cards has just been released by gripper jaws 15 and 16 at the insert table C. Just prior to this point in time, operations at the feed station had already started to prepare a package of cards for destacking. Specifically, short card aligning pin 11 mounted on slide plate 12 (see FIGS. 1 and 4) had moved from left to right in the slot provided in base plate of stacking cage 10. By this motion the edges of short cards in the lowermost package in the stack are tamped against the right vertical wall of stacking cage 10, thus providing for their uniform vertical alignment. This movement of the pin 11 and plate 12 is accomplished by suitable crank means, not shown, and which does not form a part of our invention.

Figure 4:
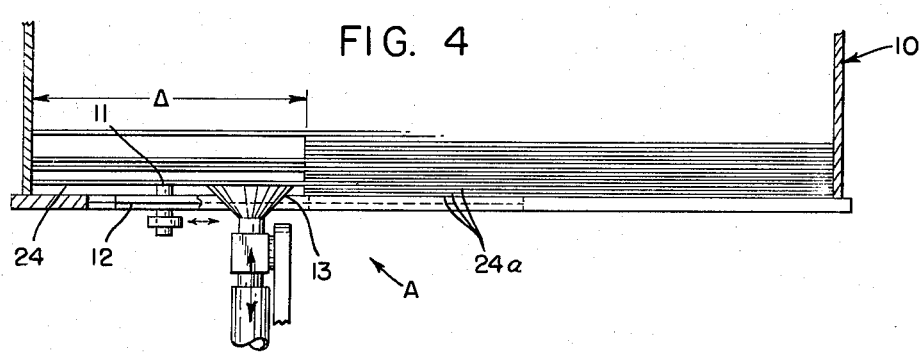
FIG. 4 is a sectional view of the feed station showing the sucker cup mechanism.

With the return of pin 11 and plate 12 to their leftmost position as viewed in FIGS. 1 and 4, sucker cup 13 has begun to move upward in a substantially vertical motion (see FIGS. 1 and 4) to engage and apply suction to the underside of the lowermost long card in the stack. As most clearly seen in FIG. 4 sucker cup 13 contacts the A dimension portion of the long card, i.e., the portion which extends beyond the dimensions of the short cards.

Upon attaining the limit of its vertical reach, sucker cup 13 begins to move forwardly and downwardly along an arcuate path (see FIGS. 2 and 5) pulling with it in a normal destacking operation, the long card to which suction is applied and the accompanying short cards disposed beneath the long card. In an improper destacking operation as shown in FIG. 2, the sucker cup will additionally carry one or more of the short cards disposed above the long cards to which suction is applied. The motion of the sucker cup is accomplished by crank and camming means not completely shown and which do not form a part of our invention.

As the sucker cup approaches the limit of its forward and downward reach, separator arms 14, rotating with shaft 27 (FIG. 5) move toward the stack of cards and supportingly engage the cards not under the influence of sucker cup 13.

During the time interval in which the sucker cup 13 and separator arms 14 perform the above described operations, gripper jaws 15 and 16 have moved along an arcuate path from their position over the insert table C as shown in FIG. 5, to a package engaging position at feed station A, as shown in FIG. 6.

The operation of the transfer mechanism assembly will now be described in detail:

As best seen in FIGS. 5 and 6, gripper jaw 16 is a fixed jaw and has an integral elongated arm 28 disposed at right angles with respect to the gripping surface of the jaw. The upper end of arm 28 is secured for rotation with shaft 29. Gripper jaw 15 is a movable jaw and is pivotably mounted with respect to fixed jaw 16 at pivot point 30 mounted in arm 28. The jaws are held in a normally closed position under the tension of spring 31 secured at one end to the rearward extension of jaw 15 and secured at its other end to spring retainer pin 32 which in turn is attached to arm 28.

It will be recognized that as the closed jaws 15 and 16 approach the feed station A they must be opened to receive a package of cards and then closed again so that the cards will be retained in the jaws as the cards are withdrawn from the stack and transported to a position over the insert table C. Similarly, the jaws must be opened to release the cards to the insert raceway 19, and then closed again for the return trip to feed station A. Separate camming means are provided to open and close the jaws at the two locations and these means will now be described:

As seen in FIGS. 3 and 6, the rearward extension of jaw 15 is provided with a stub shaft 33. To each of the distal ends of shaft 33 there are secured a cam follower arm 34 and a cam follower 35. The upper portion of cam follower arm 34 is provided with a yoke 36 (FIG. 6) within which shaft 29 is free to rotate. The upper end of cam follower arm 34 terminates in cam follower 37.

As also shown in FIG. 6, frame member 38 has secured thereto a bracket 39 to which is pivotally pinned a spring loaded cam bar 40. Cam bar 40 carries cam follower 41, which follows cam 42 which cam rotates with shaft 43. As cam follower 41 rides down under high point 44 of cam 42, cam bar 40 is in turn forced downwardly against cam follower 37. This force against cam follower 37 causes cam follower arm 34 to move downwardly against the tension of spring 31, thus causing gripper jaw 15 to pivot about pivot point 30 away from fixed jaw 16. As the high point 44 of cam 42 passes out of contact with cam follower 41, the position shown in FIG. 6, the described chain of cams and cam followers permits the jaws 15 and 16 to close upon a package of cards.

The means for opening and closing jaws 15 and 16 in the vicinity of insert table C will now be described in connection with FIG. 5. Attached to frame member 45 and located in the path of travel of cam followers 35 are a pair of matched cams 46. As the transfer mechanism B moved in a counterclockwise arcuate path to present a package of cards to insert table C, cam followers 35 approach and ultimately contact cam surfaces 47 (best seen in FIG. 6) of their respective cams 46. This contact causes movable gripper jaw 15 to pivot about pivot point 30, away from fixed jaw 16 thereby releasing the card package. After the card package is released, the transfer mechanism begins rotating in a clockwise direction whereupon cam followers 35 become disengaged from cams 46 and the jaws 15 and 16 are permitted to close under the tension of spring 31.

As best seen in FIG. 5, the card package is deposited substantially on edge at one side of the insert raceway and is supposed to fall in the direction shown by the arrows, i.e., to the left and across the raceway as viewed in FIG. 5. The hold down means indicated generally as 17 is designed to urge the card package into its correct drop position in insert raceway 19 and to maintain the package in close proximity with the raceway after the drop has been effected.

The hold down means 17 comprises a lever arm 48 pivotally mounted to frame member 45. The lower or right hand end of the lever (as viewed in FIG. 5) terminates in a generally U-shaped portion 49 to which is mounted hold down plate 50. These last two elements are best seen in FIG. 1. The upper or left hand end of lever arm 48 (as viewed in FIG. 5) is fitted with cam follower 52 which follows cam 53 which cam is mounted for rotation with shaft 43.

During an interval just prior to the time jaws 15 and 16 release a card package to insert raceway 19, cam follower 52 is in contact with large lobe portion 54 of cam 53, and in this manner, hold-down means 17 is held clear of the insert raceway 19. At about the same time that jaws 15 and 16 release a card package at the insert raceway, lobe portion 54 of cam 53 moves out of contact with cam follower 52, thus permitting lever arm 48 to swing downwardly in a clockwise motion. In this fashion kicker arm 51 moves in behind the card package and urges it into a correct drop position in the insert raceway.

The clockwise motion of lever arm 48 continues until hold down plate 50 arrives at a position parallel to and directly above insert raceway 19, see FIGS. 1 and 6. Hold down plate 50 remains in this position during the extended dwell portion of cam 53 to insure that the card package remains in proper alignment in insert raceway 19. During this dwell period, gripper jaws 15 and 16 have moved from a position over the insert table C to card package engaging position at the feed station. As the jaws 15 and 16, now gripping a new card package, move toward a position over insert table C lobe portion 54 of cam 53 approaches cam follower 52, causing lever arm 48 to rotate upwardly in a counter-clockwise direction, thus clearing insert raceway 19 for the next card package drop.

Summarizing the operation to this point, after the short cards in the bottom package in stacking cage 10 have been aligned by pin 10, sucker cup 13 engages the A dimension portion of long card in the bottom package and pulls it and the short cards associated therewith downwardly away from the stack. Separator arms 14 then move in to support the remaining card packages in stacking cage 10, not under the influence of sucker cup 13. Following this, gripper jaws 15 and 16 move in and engage the package of cards still under the influence of sucker cup 13. As the jaws begin to withdraw the card package, lever arm 48 of the insert table begins to move in a counter clockwise motion up and away from insert raceway 19. As the jaws 15 and 16 are moved to a position over the insert raceway, the card package carried therebetween is released, whereupon lever arm 48 moves downwardly in a clockwise direction so that the drop of the card package is assisted by kicker arm 51 and the alignment of the card package in insert raceway 19 is maintained by hold down plate 50.

FIG. 7 shows a card package at its point of deposition in insert raceway 19. For the sake of illustrating the modus operandi of our detector we have shown in FIG. 7 the same improperly constituted card package which is in the process of being destacked in FIG. 2. The package consists of a relatively long card 24, a plurality of short cards 24a properly associated with long card 24, and an errant short card 25b which constitutes a misfed card. It should be noted that when this card package is destacked, errant card 25b is the top-most card in the package (FIG. 2) and that when the package is deposited in insert raceway 19, the package is inverted so that errant card 25b is bottom card of the package and is in direct contact with the insert raceway (FIG. 7). We will now describe the manner in which errant card 25b is detected.

The detector, generally designated as 21 in FIGS. 7 and 8, comprises a detector switching housing 55 suitably secured to the underside of insert raceway 19. Housing 55 contains an electrical switch of conventional design. The switch itself may take any one of a number of standard forms well known to those skilled in the art such as a mercury switch, or a mechanical, electro-mechanical or hydraulic relay switch. The exact nature of the switch is not critical and does not form a part of our invention and hence has not been illustrated. The switch is connected by wires 56 to the electrical system of the machine. The circuitry involved will be described more fully hereinafter.

The switch in housing 55 which is in a normally closed position, is opened by the action of plunger 57. The plunger is activated by detecting finger 22 which is pivotally mounted at point 58 to bracket 59 which bracket in turn is secured to housing 55.

The detector also comprises a guide bar 23 secured at one end by bolts 60 to the floor of insert raceway 19. The other end of guide bar 23 is free and extends beyond the point where detecting finger 22 protrudes up through the floor of insert raceway 19. The bar 23 is constructed of sufficiently firm material, such as spring steel, so that it does not deflect to any appreciable extent under the weight or force of the cards.

As previously mentioned, FIG. 7 shows the card package at the point where it is first deposited in insert raceway 19. The package will subsequently be moved from right to left (as viewed in FIG. 7) under the influence of dogs 20 which are attached to and driven by endless chain belts 61. With respect to the site where the cards are initially deposited on the insert raceway, the free end of guide bar 23 is located downstream of the leading edges of short cards 24a and short card 25b, and at least as far upstream as the leading edge of long card 24. Thus in the embodiment shown in FIG. 7, the free end of guide bar 23 supports the Δ dimension portion of long card 24. As also shown in FIG. 7, detecting finger 22 is positioned in the portion of raceway 19 which receives the Δ dimension of long card 24. While this is the most preferred embodiment, the detecting device will also operate effectively with finger 22 located downstream of the leading edge of long card 24, so long as the free end of guide bar 23 supports the Δ dimension portion of long card 24.

The important consideration to note is that at least a portion of detector 21 is positioned so that the leading edges of the short cards 24a and 25b fall upstream or ahead of the said portion, and that the leading edge of long card 24 falls at least as far downstream as said portion, and preferably a little further downstream as a safety measure. This arrangement is important because it effects an initial separation between the properly associated cards 24–24a, and the misfed, errant card 25b. Specifically, this arrangement allows errant card 25b to rest flat against the floor of insert raceway 19, while the long card 24 and the short cards 24a resting thereon have their leading edges raised somewhat from the surface of the insert raceway due to the intervention of a portion of detector 21.

As the card package is moved to the left (as viewed in FIG. 8) under the influence of chain driven dogs 20, long card 24 and accompanying short cards 24a ride up and over detecting finger 22 and guide bar 23. On the other hand, errant card 25b rides directly into detecting finger 22, causing it to pivot counter-clockwise around point 58. This movement depresses plunger 57 which opens the normally closed switch contained in housing 55. As will be shown in a moment, opening this switch stops the machine and energizes certain signal devices which call the detection of the misfeed to the attention of the machine operator.

As shown in FIGS. 1 and 7, the upper end of detecting finger 22 has a beveled surface facing into the direction of card movement. Thus, when finger 22 is contacted with the leading edge of errant card 25b, the finger will move as heretofore described, but when the limit of this movement has been reached, the leading edge of card 25b, under the urging of chain driven dogs 20, will ride up the beveled surface of finger 22, and thence over the finger but under guide bar 23, finally coming to rest in the space between raceway 19 and guide bar 23; to the right of bolts 60 and to the left of finger 22. This space has been provided in our preferred embodiment to protect the errant card from being crumpled during the short interval of time between the moment the switch in housing 55 is opened, until the moment the machine, and in particular, chain driven dogs 20, actually stop. This interval of time is only a fraction of a second, but is of sufficient duration to crumple errant card 25b if the card was stopped dead by finger 22 rather than permitted to ride up over the finger into the space provided under guide bar 23.

In a less preferred embodiment, the functions of guide bar 23 and detecting finger 22 can be combined in a single element by eliminating the guide bar as shown in FIG. 7 and providing finger 22 with a short horizontal extension facing in the direction of travel of the cards. This element must be so positioned that at least a portion thereof supports the Δ dimension of the long card. By this modifications, finger 22 acts as a positive stop for errant card 25b. While this modification does crumple the errant card, it nevertheless provides a completely effective detecting means.

A specific embodiment of electrical circuitry for our detector is shown in FIG. 9. The normally closed microswitch designated M.S. (N.C.) is wired in series with the main switch of the motor which operates the machine. The depression of plunger 57, opens the normally closed micro-switch, thereby cutting off power to the motor, and simultaneously closes the circuit to a buzzer, light, or similar signal device. With the misfeed thus detected and the detection thus called to the operator's attention, it is a simple matter to remove errant card 25b from insert raceway 19 and place it in the package of cards it should have accompanied had there not been a misfeed.

Since many changes could be made in the embodiment of the invention, particularly described and shown herein, without departing from the scope of the invention, it is intended that this embodiment be considered as exemplary and that the invention not be limited except as warranted by the following claims.

We claim:

1. In a device for processing packages of sheets wherein a package is defined as two or more superposed sheets of material, one of which sheets has at least one major dimension which is greater than the corresponding major dimension of the other sheet or sheets in the package; this dimensional differential being hereinafter referred to as the Δ dimension:
    (a) means providing a surface, having an upstream end and a downstream end, on and past which said package is adapted to be fed from a point upstream to a point downstream,
    (b) a site at the upstream end of said surface adapted to receive said package oriented with the Δ dimension facing downstream, and
    (c) detector means comprising
        (i) a detecting finger at least a portion of which projects upwardly from said surface, and
        (ii) an elongated guide means positioned above said surface and above said detecting finger, said guide means having a first end secured to said surface at a point downstream of the upward projection of said detecting finger, said guide means having a freely disposed second end extending at least as far upstream as said detecting finger and terminating over a portion of site (b) which receives the Δ dimension.

2. In a device for processing packages of sheets wherein a package is defined as two or more superposed sheets of material, one of which sheets has at least one major dimension, which is greater than the corresponding major dimension of the other sheet or sheets in the package; this dimensional differential being hereinafter referred to as the Δ dimension:
    (a) a surface having an upstream end and a downstream end adapted to receive said package at a predetermined site at its upstream end,
    (b) means for transporting said package along said surface from its upstream end toward its downstream end, (c) means for depositing said package at the predetermined site at the upstream end of said surface, oriented with the Δ dimension facing downstream, and (d) detector means at least a portion of which projects upwardly from said surface at a point in said predetermined upstream site which receives the Δ dimension.

3. In a device for processing packages of sheets wherein a package is defined as two or more superposed sheets of material, one of which sheets has at least one major dimension which is greater than the corresponding major dimension of the other sheet or sheets in the package; this dimensional differential being hereinafter referred to as the Δ dimension:

(a) a surface having an upstream end and a downstream end adapted to receive said package at a predetermined site at its upstream end, (b) motor driven means for transporting said package along said surface from its upstream end toward its downstream end, (c) means for depositing said package at the predetermined site at the upstream end of said surface, oriented with the Δ dimension facing downstream, and (d) detector means comprising
  (i) a detecting finger at least a portion of which projects upwardly from said surface, and
  (ii) an elongated guide means positioned above said surface and above said detecting finger, said guide means having a first end secured to said surface at a point downstream of the upward projection of said finger, said guide means having a freely disposed second end extending at least as far upstream as said detecting finger and terminating over a portion of said predetermined site which receives the Δ dimension.

4. The device of claim 3 in which the detector means (d) additionally includes:
  (iii) a switch connected to the motor which drives the means for transporting the package along said surface, and
  (iv) means responsive to the activation of said detecting finger for tripping said switch whereby said motor is stopped.

5. In a device for processing packages of cards wherein a package is defined as two or more superposed cards one of which cards is longer than the other card or cards in the package; this dimensional differential hereinafter being referred to as the Δ dimension:

(a) a stacking cage adapted to hold a plurality of said card packages in superposed arrangement, (b) means for destacking one package at a time from said stacking cage, (c) an insert raceway having an upstream end and a downstream end, adapted to receive a card package at a predetermined site at said upstread end, (d) means for transporting a destacked cage to said insert raceway and for depositing the package at said predetermined site in said insert raceway with the Δ dimension of the longer card facing downstream, and, (e) detector means at least a portion of which projects upwardly from said insert raceway at a point in said predetermined upstream site which receives the Δ dimension.

6. In a device for processing packages of cards wherein a package is defined as two or more superposed cards one of which cards is longer than the other card or cards in the package; this dimensional differential being hereinafter referred to as the Δ dimension:

(a) a stacking cage adapted to hold a plurality of said card packages in superposed arrangement, (b) suction means for destacking one said package at a time from the bottom of said stacking cage, (c) an insert raceway having an upstream end and a downstream end, adapted to receive a card package at a predetermined site at the upstream end, (d) gripper jaw means adapted to engage a destacked card package at said stacking cage, transport the package to said insert raceway and deposit the package at said predetermined upstream site with the Δ dimension of the longer card facing downstream, (e) motor driven means located in said insert raceway adapted to move the card package downstream along said raceway from said predetermined upstream site, (f) detector means comprising
  (i) a switch housing secured to the underside of of said insert raceway
  (ii) a normally closed micro-switch mounted in said housing and connected to the motor which drives the means to move the card package along the insert raceway.
  (iii) a detecting finger having one end pivotally mounted to said housing and having its other end projecting upwardly through a portion of the predetermined upstream site of the insert raceway which receives the said Δ dimension, and
  (iv) a plunger mounted in said switch housing adapted to open said switch in response to pivotal movement of said detecting finger, whereby the said motor is stopped.

7. The device of claim 6 in which the detector means additionally comprises an enlongated guide bar positioned above the insert raceway and above the detecting finger, said guide bar having a first end secured to said insert raceway at a point downstream of the upward projection of said detecting finger, said guide bar having a freely disposed second end extending at least as far upstream as the upward projection of said detecting finger, and terminating over a portion of the predetermined upstream site of the insert raceway which receives said Δ dimension.

References Cited in the file of this patent

UNITED STATES PATENTS

| 305,747 | Farnham | Sept. 30, 1884 |
| 3,049,845 | Hanson | Aug. 21, 1962 |